US012652443B2

(12) United States Patent
Boucher et al.

(10) Patent No.: US 12,652,443 B2
(45) Date of Patent: Jun. 9, 2026

(54) OPTIMIZED TRANSMISSION OF REAL-TIME SYNTHETIC MEDIA

(71) Applicant: Samsung Electronics Co., Ltd., Suwon-si (KR)

(72) Inventors: Maxime Boucher, Mountain View, CA (US); Anthony Liot, San Jose, CA (US); Sajid Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 18/766,479

(22) Filed: Jul. 8, 2024

(65) Prior Publication Data

US 2026/0012689 A1     Jan. 8, 2026

(51) Int. Cl.
| | |
|---|---|
| *H04N 21/218* | (2011.01) |
| *H04N 19/172* | (2014.01) |
| *H04N 21/2183* | (2011.01) |
| *H04N 21/234* | (2011.01) |
| *H04N 21/236* | (2011.01) |
| *H04N 21/414* | (2011.01) |
| *H04N 21/418* | (2011.01) |
| *H04N 21/426* | (2011.01) |
| *H04N 21/442* | (2011.01) |
| *H04N 21/81* | (2011.01) |

(52) U.S. Cl.
CPC ......... *H04N 21/816* (2013.01); *H04N 19/172* (2014.11); *H04N 21/23424* (2013.01); *H04N 21/236* (2013.01)

(58) Field of Classification Search
None
See application file for complete search history.

(56) References Cited

U.S. PATENT DOCUMENTS

| | | | | |
|---|---|---|---|---|
| 6,384,821 B1 * | 5/2002 | Borrel | ..................... | H04L 65/80 |
| | | | | 375/E7.012 |
| 2012/0082226 A1 * | 4/2012 | Weber | .................... | H04N 7/141 |
| | | | | 375/E7.246 |
| 2016/0073117 A1 * | 3/2016 | Grasmug | ............... | H04N 19/23 |
| | | | | 375/240.26 |
| 2024/0119710 A1 * | 4/2024 | Bhasin | ................. | G06V 10/774 |

OTHER PUBLICATIONS

Fragmented mp4, Retrieved Jul. 3, 2024.
Microsoft Smooth Streaming, Retrieved Jul. 3, 2024.

* cited by examiner

*Primary Examiner* — Brian T Pendleton
*Assistant Examiner* — Jean D Saint Cyr

(57) ABSTRACT

In one embodiment, a method includes generating, by a memory of a GPU of a server computing device, synthetic video content for a real-time video stream and encoding, by a memory of a GPU of the server computing device, the synthetic video content. The method further includes multiplexing, by a memory of a CPU of the server computing device, the encoded synthetic video content; and transmitting the multiplexed encoded synthetic video content from the server computing device to a client computing device, without storing (1) the generated synthetic video content (2) the encoded synthetic video content and (3) the multiplexed encoded synthetic video content in a hard-disk memory of the server computing device during the method.

20 Claims, 6 Drawing Sheets

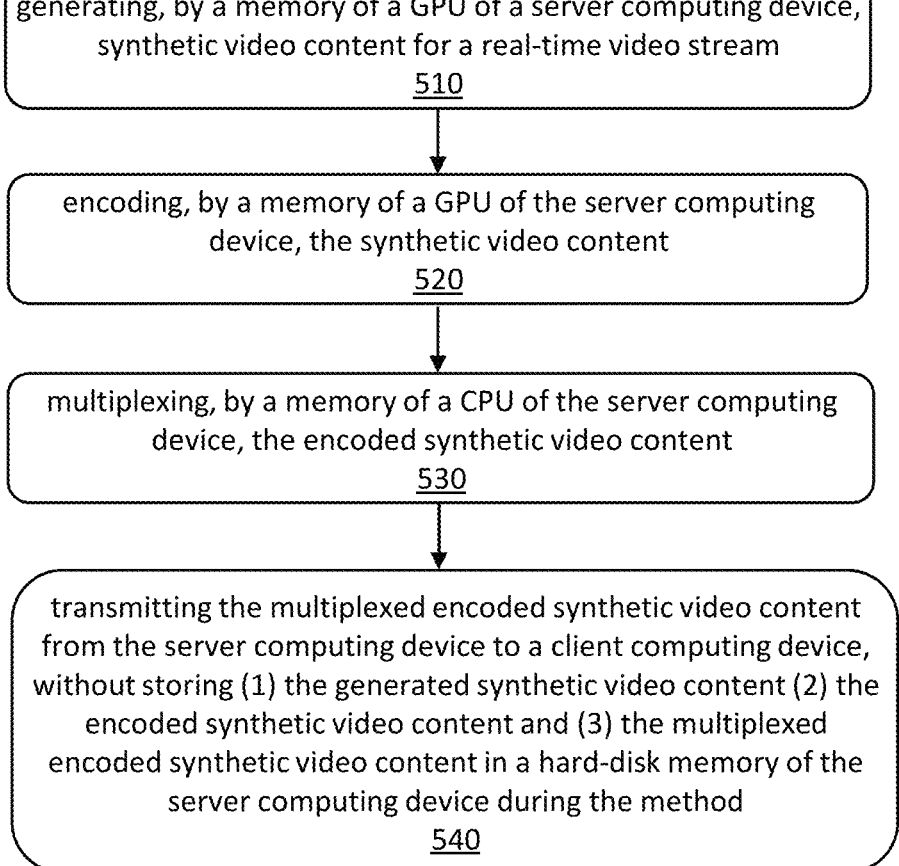

generating, by a memory of a GPU of a server computing device, synthetic video content for a real-time video stream
510 encoding, by a memory of a GPU of the server computing device, the synthetic video content
520 multiplexing, by a memory of a CPU of the server computing device, the encoded synthetic video content
530 transmitting the multiplexed encoded synthetic video content from the server computing device to a client computing device, without storing (1) the generated synthetic video content (2) the encoded synthetic video content and (3) the multiplexed encoded synthetic video content in a hard-disk memory of the server computing device during the method
540

Fig. 5

OPTIMIZED TRANSMISSION OF REAL-TIME SYNTHETIC MEDIA

TECHNICAL FIELD

This application generally relates to optimized transmission of real-time synthetic media.

BACKGROUND

Synthetic media generation can involve generating virtual media, such as virtual image media and/or virtual audio media. Synthetic media generation can include generating virtual humans, which may also be known as avatars. Generating synthetic media is typically accomplished through the use of neural networks and deep-learning techniques.

In many use cases, synthetic media must be generated in at or near real time. For example, an avatar's actions, emotions, expressions, movements, etc. may reflect corresponding attributes of a real human, i.e., the avatar may mimic what a real human is doing in real time. This real-time requirement for synthetic content generation creates significant challenges for generating the content fast enough to avoid latency delays in the content without significantly degrading the quality of the synthetic content.

BRIEF DESCRIPTION OF THE DRAWINGS

FIG. 5 illustrates an example method using the architecture of FIG. 1 for optimized transmission of a real-time synthetic video stream.

DESCRIPTION OF EXAMPLE EMBODIMENTS

There are multiple challenges to generating synthetic media in at or near real-time conditions, especially when the media is involved in two-way interactions among various users (e.g., the media can respond to its environment and be manipulated by its environment). Traditional approaches to generating synthetic media involve using (1) neural networks to output the appropriate media for a given context and (2) a significant amount of encoding to maintain video quality.

For example, an ML model may be generating a real-time video stream, such as a virtual avatar, for display in a real-time virtual environment. Because the stream occurs in real time, the stream must have low latency and low resource usage while maintaining good stream quality. Here, the quality requirement is more challenging than in scenarios that use pre-encoded video. This is because the most efficient encoders in quality per bitrate sacrifice speed for encoding (because they need to use many optional optimizations). However, when encoding a video at typical real-time rates (e.g., at 30 fps), the system cannot perform all the compression algorithms and/or use certain compression techniques due to the latency that doing so would introduce. As a result, using hardware encoders such as, for example, NVenc API for Nvidia GPU multimedia encoder (e.g., the h.264 codec) will result in a lower-quality video feed in exchange for better encoding speed.

Figure 1:
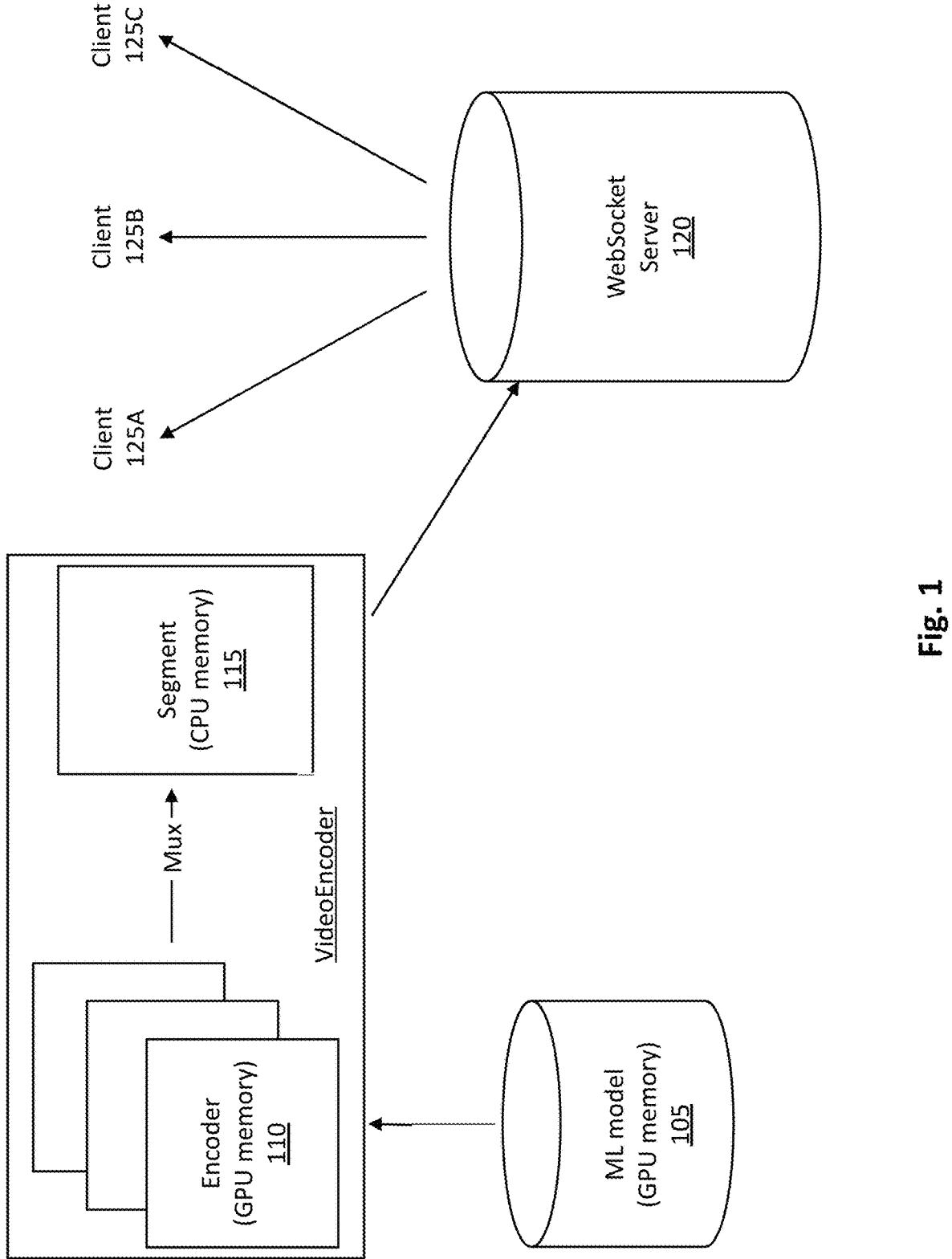
FIG. 1 illustrates an example system for optimized transmission of real-time synthetic media.

In contrast, the techniques and systems described herein provide fast encoding, high quality video, and low resources usage—attributes that are usually contradictory—for generating and displaying synthetic content in at or near real-time time frames. FIG. 1 illustrates an example overall system for achieving these outcomes. As illustrated in FIG. 1, an ML model executing in GPU memory 105 on a server provides output (e.g., a rendered avatar) directly to encoder 110, which also executes on a GPU memory. The encoded output is sent directly to CPU memory 115 for multiplexing, and at no point is either the ML model's output or the encoded output stored in a (or in some cases, any) hard-disk (or similar) memory, and therefore there is no need for costly writing and fetch operations to a hard disk. In addition, in particular embodiments the encoded output represents only a few hundred milliseconds worth of video. The baseMediaDecode Time, which is metadata inside an mp4 format, is patched on the fly (e.g., automatically set to 0) by the server, guaranteeing the start of the stream in the video player to be the latest segment of the mp4 video, which makes the stream a livestream feed, as random seeking or playback is not needed. Broadcasting the livestream feed using the architecture of FIG. 1 results in an extremely low footprint on computational resources. In particular embodiments, a server may have a single CPU and multiple GPUs, and can serve multiple clients.

In the example of FIG. 1, the multiplexed output from CPU 115 is sent to server 120 (e.g., a WebSocket server), which sends the output data to connected clients (e.g., to clients 125A, 125B, and 125C), as appropriate. The output from the server includes metadata such as the baseMediaDecodeTime, which is metadata inside the mp4 format, specifying the time to decode the frame. If this parameter is set to 0, then that value represents the very start of a video. Therefore, particular embodiments reset this parameter to 0, for each piece of media sent by server 120 to clients 125.

Figure 2:
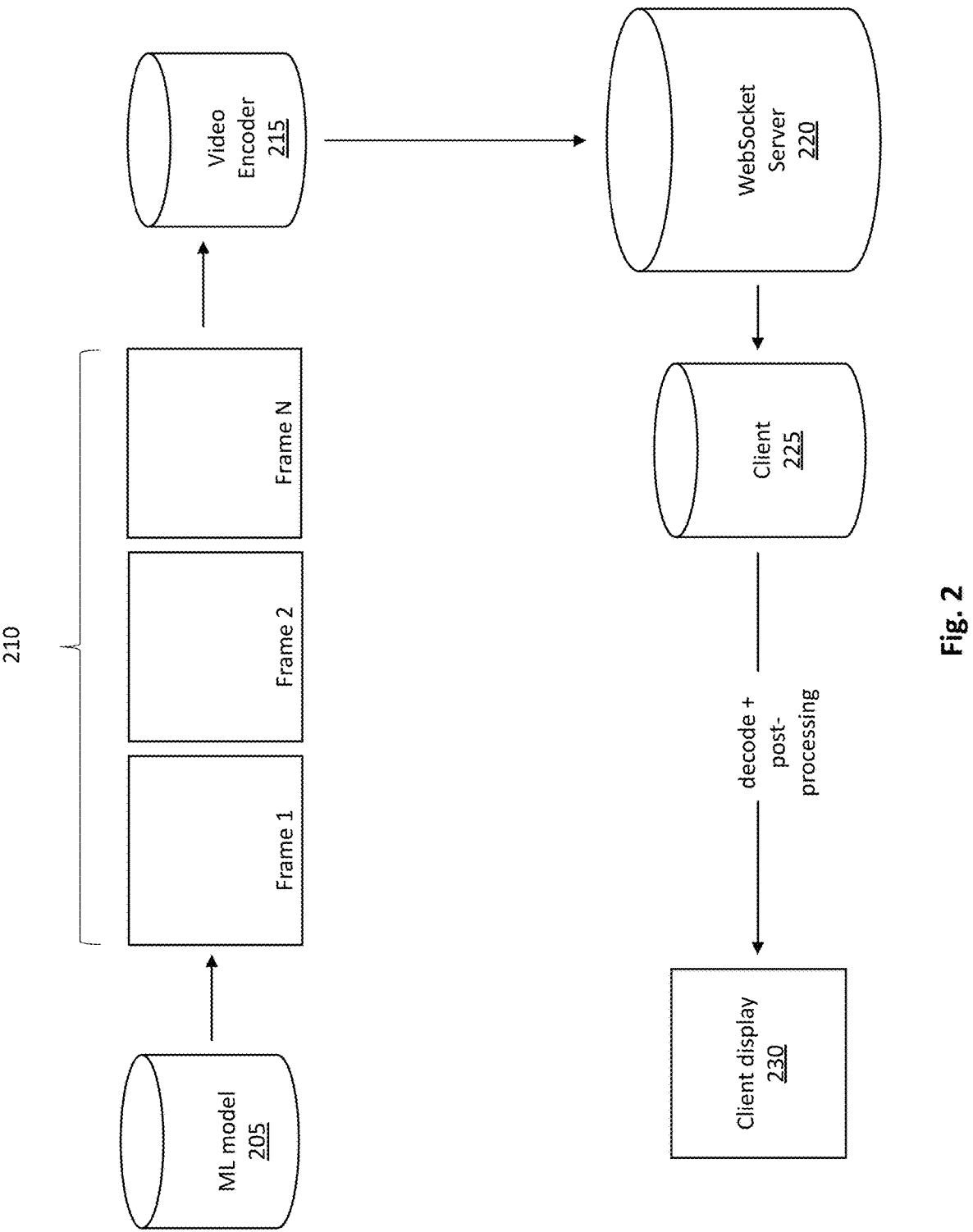
FIG. 2 illustrates an example embodiment using P frames.

Particular embodiments offload at least some of the post processing (e.g., chromakeying) to the client side, which increases space redundancy of the video for bandwidth and CPU usage optimization. For video that involves a very little motion, such video is also very redundant time wise. Particular embodiments therefore rely on P frames, which are fames that are encoded using the data from previous frames (e.g., in reference to the previous frames plus some change). Using P frames doesn't create latency but is more efficient for frames that have relatively low motion than is using IDR frames, which are explained more fully below. FIG. 2 illustrates an example embodiment. The ML model 205 outputs frames 210 that each have relatively low motion and relatively uniform backgrounds, and therefore have a relatively high space and time redundancy. The frames are sent to a video encoder 215, which (using the CPU described above with reference to FIG. 1) is sent to a WebSocket server 220. The video is received by a client device 225 (e.g., a smartphone, a TV, a tablet, etc.), which implements the post-processing (e.g., decoding and chromakeying) to result in the high-quality video feed displayed on client display 230.

As explained herein, in some embodiments, the techniques and architecture of this disclosure provide real-time video of synthetically generated content at high framerates without sacrificing video quality, in part due to the fact that the output of the ML GPUs are not stored in hard-disk memory at the server. This means that particular embodiments can send an IDR frame in a video stream to a client only upon some threshold condition. An IDR frame is a complete frame in a video, in that the frame can be decoded based entirely on information within the frame itself. After a connection is made using an IDR frame, then P frames are successively used unless (1) the connection terminates or (2) a frame drop occurs. Upon detection of either or at least one of these events, the server provides another IDR frame to be encoded for delivery for that particular client. Therefore, instead of using an "IDR P P P P . . . P" succession of frames, particular embodiment use an "IDR P P P . . . IDR" succession, where the IDR is only generated because of a new connection, a dropped frame, or, in particular embodiments, after a very long interval between IDR frames. These techniques allow for an even lower average bitrate. Moreover, B frames are not used at all by these techniques, as B frames are unsuitable for low latency purposes, because a B frame is encoded based on the information in both a past frame and a future frame, and therefore inherently results in increased latency.

Figure 3:
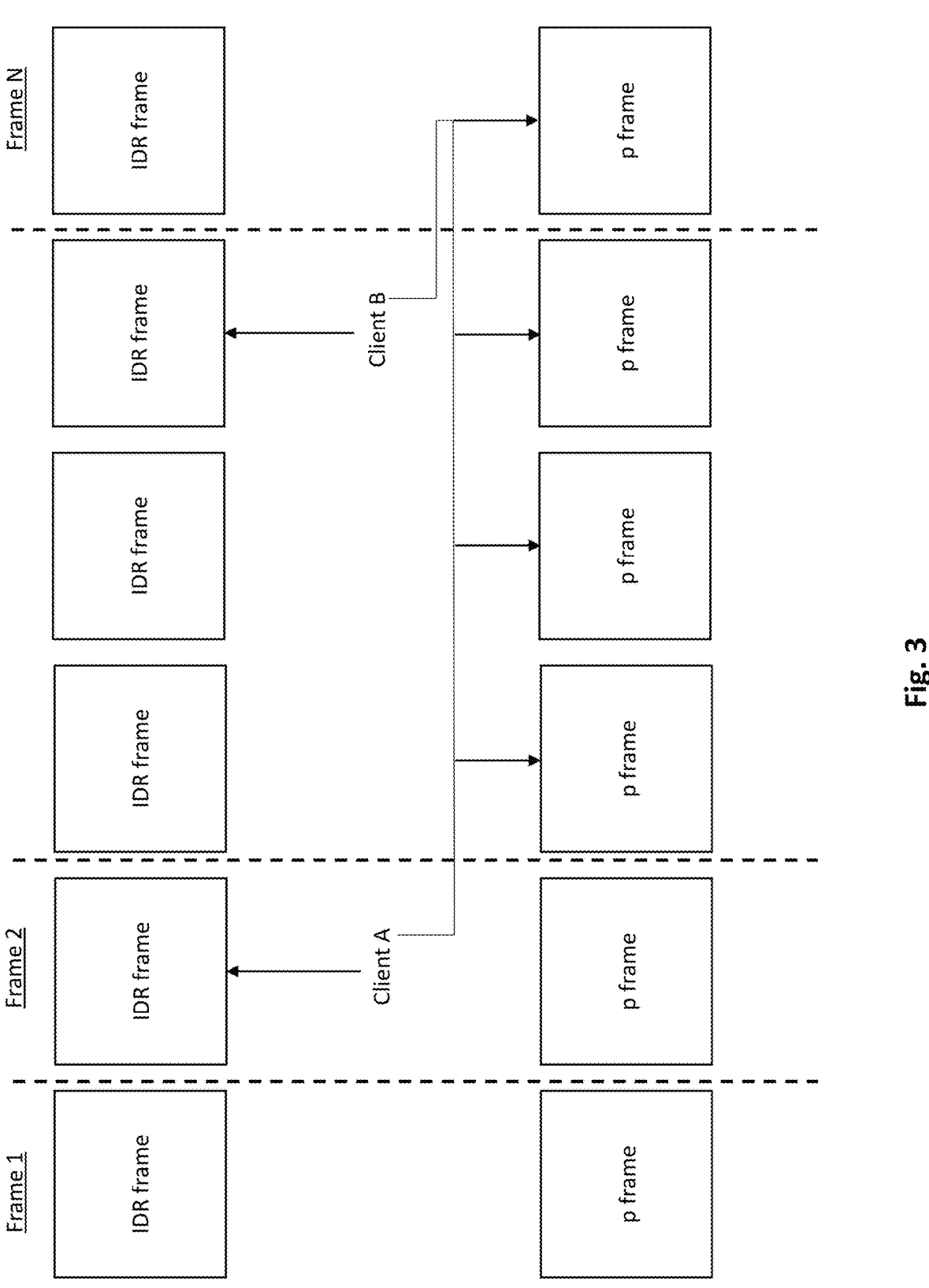
FIG. 3 illustrates an example of a system that generates two versions of every video frame: a P frame and an IDR frame.

If an IDR frame was sent to all clients when one (e.g., any one) client connected to the server, then lower-quality frames would be more frequently sent to all clients, as an IDR frame encoded and decoded in real time will have lesser quality relative to a P frame. Thus, particular embodiments encode both an IDR frame and P frame for each video frame, so that only a newly connected client (or client that meets other triggering conditions discussed above) gets the IDR frame and the other clients continue to receive P frames. A GPU encoder, such as encoder 110 in FIG. 1, can encode at twice a video's playback framerate, and therefore encoding two versions of a video frame does not introduce latency into the system. FIG. 3 illustrates an example of a system that generates two versions of every video frame: a P frame and an IDR frame. For each of the 1 to N video frames, the encoder at the server encodes two versions of the frame: a P frame and an IDR frame. As shown in FIG. 3, Client A joins the live stream such that the first frame Client A receives is frame 2 of the stream. The server provides an IDR version of frame 2 and then provides a P version of subsequent frames. At a later time, Client B joins. Client B is provided an IDR version of the first frame it receives (while Client A receives a P-frame version of that same frame), and then Client B receives P frames for the subsequent frames.

Figure 4:
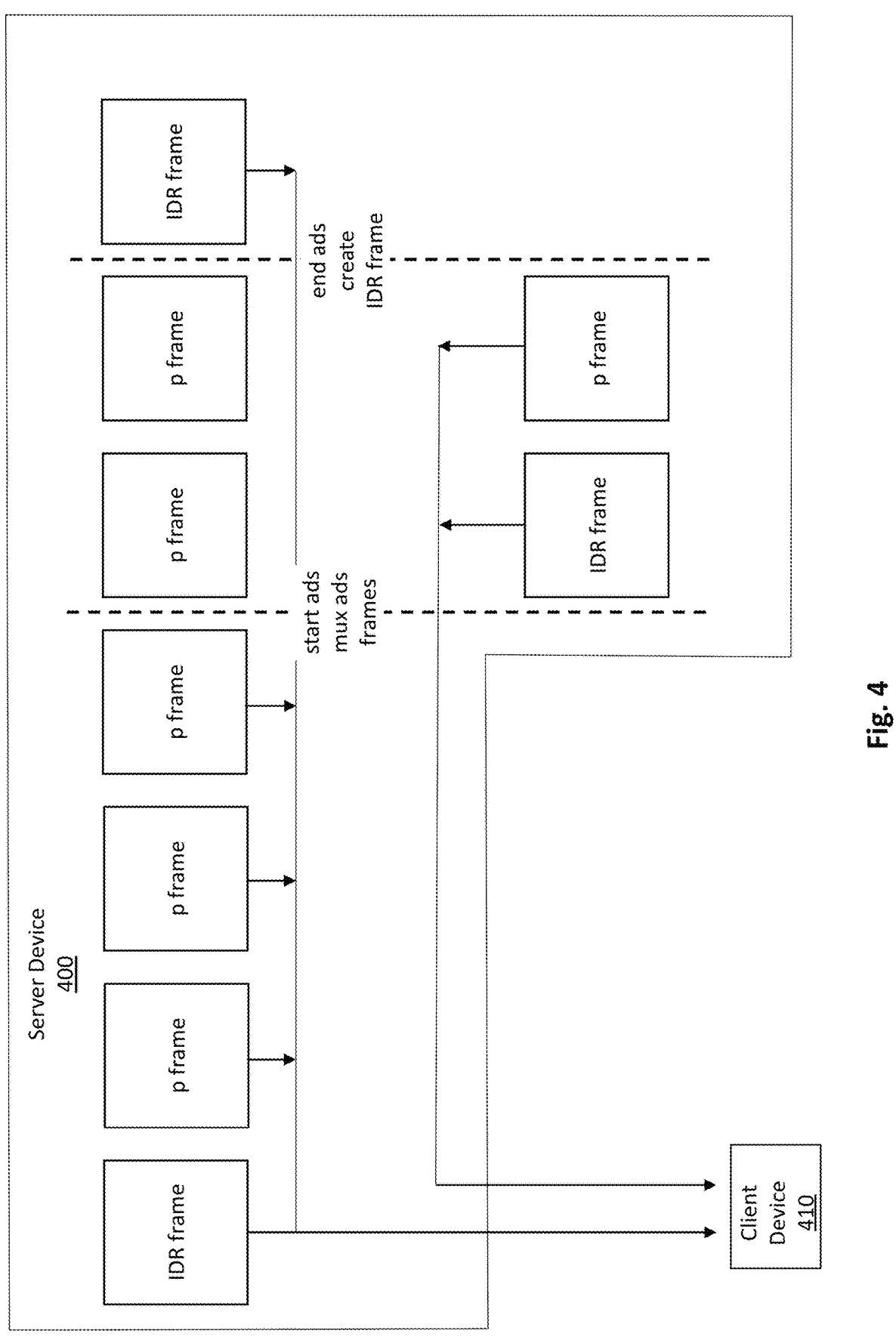
FIG. 4 illustrates an example embodiment of interspersing an advertisement video stream into a real-time video stream.

Particular embodiments may create a WebSocket livestream with essentially non-blockable advertisements by injecting an advertisement in the real-time generated video. The advertisement video matches the framerate of the real-time video and therefore can keep the same properties as the playback video, such as time per segment. The final video feed sent to a client is a merger of both the live stream and the advertisement stream, and therefore it is extremely difficult for ad blockers to detect and block the advertisement. FIG. 4 illustrates an example embodiment of interspersing an advertisement video stream into the real-time video stream, from the perspective of client device 410. As illustrated in FIG. 4, server device 400 provides an IDR frame of a video stream when client device 410 connects and then subsequently provides P frames to that client device. At an advertising start time, which may be determined from the start time of client device 410's connection (and therefore may be different for different client devices), server 400 provides an IDR frame as the initial frame of the advertisement and then provides subsequent P frames for the advertisement. At the advertisement end time, server 400 provides an IDR frame for the video stream and then subsequently provides P frames to client device 410. As illustrated in FIG. 4, server device 400 may continue generating frames for the video stream while transmitting advertisement frames to client device 410, and therefore server device 400 may serve ads at different times to different client devices, all while serving frames from the video stream to other connected client devices.

While the examples above relate to video as the media stream, the techniques and systems disclosed herein are applicable to other forms of broadcasted media, such as music or other audio. In such embodiments, the video-frame-specific optimizations are not applicable, such as chromakeying on the client side, and the bitrate requirements for non-video media are lower. Therefore, the techniques described herein lead to substantial improvements in the performance of the server providing a broadcasted media stream. Moreover, in particular embodiments, an AI-generated voice stream may be generated and then not stored in a hard-disk memory (or any hard-disk or similar memory), which would address privacy concerns that both businesses and consumers have about, e.g., voice-stream data generated by an AI virtual assistant. Because GPUs and CPUs would only temporarily store the stream in such embodiments, as the data in those memory locations is immediately overwritten by subsequent data, implementations that encrypt and secure the GPU/CPU memory may provide completely end-to-end encrypted streams from an AI assistant to a user, preventing even cloud-provider snooping.

FIG. 5 illustrates an example method using the architecture of FIG. 1 for optimized transmission of a real-time synthetic video stream. Step 510 of the example of FIG. 5 includes generating, by a memory of a GPU of a server computing device, synthetic video content for a real-time video stream. Step 520 of the example method of FIG. 5 includes encoding, by a memory of a GPU of the server computing device, the synthetic video content. Here, the GPUs and corresponding memories for performing steps 510 and steps 520 may be the same or may be different, e.g., the server may have multiple GPUs or may have a single GPU. Moreover, as illustrated in the example of FIG. 1, some of the functions of steps 510 and 520 may be performed by more than one GPU, e.g., encoding may be performed by multiple GPUs.

Step 530 of the example method of FIG. 5 includes multiplexing, by a memory of a CPU of the server computing device, the encoded synthetic video content. This creates a block of video for transmission to one or more client devices. Step 540 of the example method of FIG. 5 includes transmitting the multiplexed encoded synthetic video content from the server computing device to a client computing device. As explained above, during the generation, encoding, multiplexing, and transmission processes, the respective video is stored only in the GPU memories or the CPU memory of the server device; this content is not stored in a hard-disk memory of the server device, therefore drastically decreasing latency by eliminating the need to save or seek video segments from a hard-disk memory.

Figure 6:
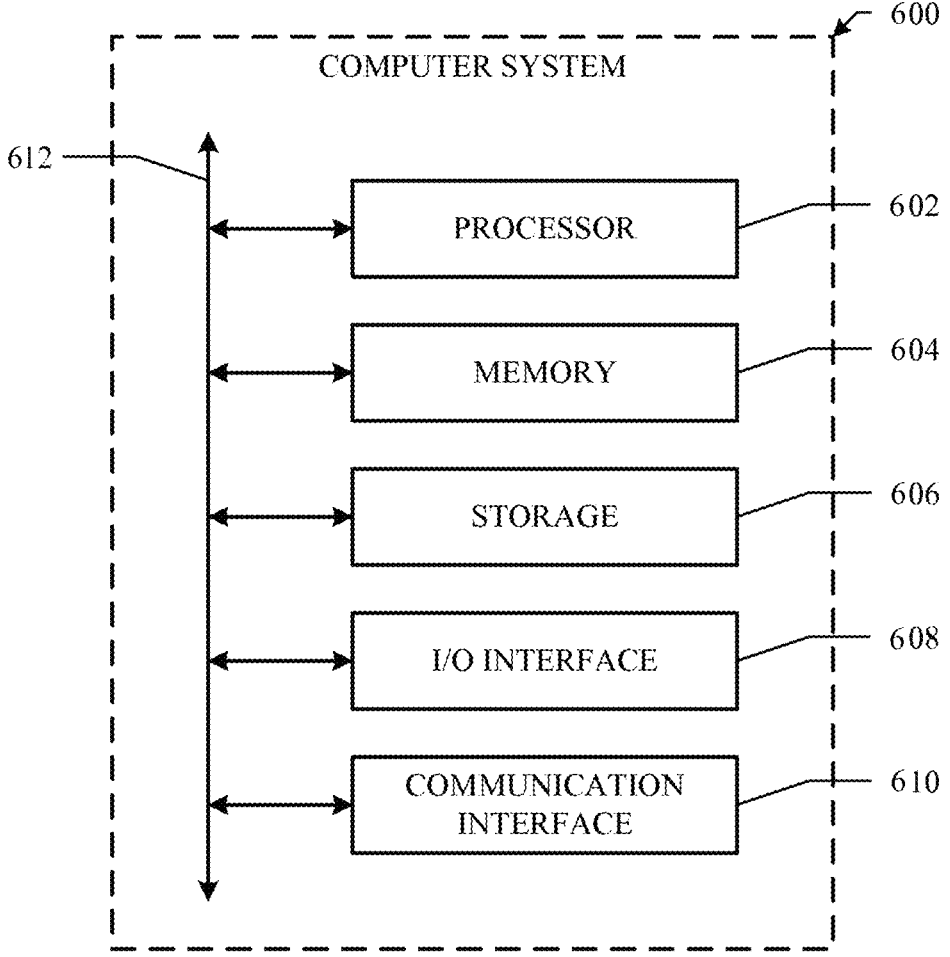
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

generating, by a GPU of a server computing device, synthetic video content for a real-time video stream;

storing the generated synthetic video content in a memory of the GPU without storing the generated synthetic video content in any hard-disk memory of the server;

encoding, by a GPU of the server computing device, the synthetic video content;

storing the encoded synthetic video content in the memory of the GPU without storing the encoded synthetic video content in any hard-disk memory of the server;

accessing, by a CPU of the server computing device and from the GPU memory, the encoded synthetic video content;

multiplexing, by a CPU of the server computing device, the encoded synthetic video content;

storing the multiplexed encoded synthetic video content in a memory of the CPU without storing the multiplexed synthetic video content in any hard-disk memory of the server; and

transmitting the multiplexed encoded synthetic video content from the server computing device to a client computing device, without storing any of the following in a hard-disk memory of the server computing device: (1) the generated synthetic video content, (2) the encoded synthetic video content, and (3) the multiplexed encoded synthetic video content, wherein the hard-disk memory is distinct from the memory of the GPU and the memory of the CPU.

2. The method of claim 1, wherein the transmitted multiplexed encoded synthetic video content comprises a block of video of less than 1 second in playback time.

3. The method of claim 2, further comprising adjusting, before each transmission by the server computing device of the multiplexed encoded synthetic video content, a metadata defining a video start time for the block of video to have a value of 0.

4. The method of claim 3, wherein the block of video comprises a plurality of P frames.

5. The method of claim 4, wherein the block of video further comprises an instantaneous decoder refresh (IDR) frame.

6. The method of claim 5, further comprising:
determining (1) that the client computing device has established a new connection to the server computing device or (2) that a frame in the real-time video stream was dropped during a transmission to the client computing device; and
in response to the determination, selecting an instantaneous decoder refresh (IDR) frame to include in the block of video.

7. The method of claim 1, further comprising encoding each frame of the synthetic video content to each of a P frame and an instantaneous decoder refresh (IDR) IDF frame.

8. The method of claim 1, further comprising interspersing a second video stream comprising an advertisement with the real-time video stream.

9. The method of claim 1, wherein the synthetic video content comprises an avatar.

10. A system comprising:
a server computing device comprising:
at least one GPU and an associated GPU memory operable to:
generate synthetic video content for a real-time video stream;
store the generated synthetic video content for the real-time video stream in the GPU memory without storing the generated synthetic video content to a hard-disk memory of the server;
at least one GPU and an associated GPU memory operable to:
encode the synthetic video content;
store the encoded synthetic video content in the GPU memory without storing the encoded synthetic video content to the hard-disk memory of the server;
at least one CPU and an associated CPU memory operable to:
access, from the GPU memory, the encoded synthetic video content;
multiplex the encoded synthetic video content;

store the multiplexed encoded synthetic video content in a memory of the CPU without storing the multiplexed synthetic video content in any hard-disk memory of the server and
transmit the multiplexed encoded synthetic video content from the server computing device to a client computing device without storing any of the following in a hard-disk memory of the server computing device: (1) the generated synthetic video content, (2) the encoded synthetic video content, and (3) the multiplexed encoded synthetic video content, wherein the hard-disk memory is distinct from the memory of the GPU and the memory of the CPU; and
the client computing device configured to:
receive the transmitted multiplexed encoded synthetic video content;
decode the transmitted multiplexed encoded synthetic video content; and
play the transmitted multiplexed encoded synthetic video content on a display of the client computing device.

11. The system of claim 10, wherein the transmitted multiplexed encoded synthetic video content comprises a block of video of less than 1 second in playback time.

12. The system of claim 11, wherein the at least one CPU and the associated CPU memory are operable to adjust, before each transmission by the server computing device of the multiplexed encoded synthetic video content, a metadata defining a video start time for the block of video to have a value of 0.

13. The system of claim 12, wherein the block of video comprises a set of P frames.

14. The system of claim 13, wherein the block of video further comprises an instantaneous decoder refresh (IDR) frame.

15. The system of claim 14, wherein the at least one CPU and the associated CPU memory are operable to determine (1) that the client computing device has established a new connection to the server computing device or (2) that a frame in the real-time video stream was dropped during a transmission to the client computing device; and
in response to the determination, select an instantaneous decoder refresh (IDR) frame to include in the block of video.

16. The system of claim 10, further comprising at least one GPU and an associated GPU memory operable to encode each frame of the synthetic video content to both of a P frame and an instantaneous decoder refresh (IDR) frame.

17. The system of claim 10, wherein the at least one CPU and the associated CPU memory are operable to intersperse a second video stream comprising an advertisement with the real-time video stream.

18. The system of claim 10, wherein the client computing device is further configured to process the received video content.

19. The system of claim 18, wherein the client computing device is further configured to apply chromakeying to the received video content.

20. The system of claim 10, wherein the synthetic video content comprises an avatar.

* * * * *